United States Patent
Yoshida

(10) Patent No.: US 8,206,276 B2
(45) Date of Patent: Jun. 26, 2012

(54) MACHINE TOOL

(75) Inventor: Makoto Yoshida, Niwa-Gun (JP)

(73) Assignee: Okuma Corporation, Niwa-gun (JP)

( * ) Notice: Subject to any disclaimer, the term of this patent is extended or adjusted under 35 U.S.C. 154(b) by 319 days.

(21) Appl. No.: 12/356,642

(22) Filed: Jan. 21, 2009

(65) Prior Publication Data

US 2009/0209398 A1 Aug. 20, 2009

(30) Foreign Application Priority Data

Feb. 15, 2008 (JP) ................................. 2008-035063

(51) Int. Cl.
*B23Q 3/157* (2006.01)
*B23Q 3/155* (2006.01)
*B23P 23/00* (2006.01)
*B23B 3/22* (2006.01)

(52) U.S. Cl. ................ 483/17; 483/18; 483/54; 483/40; 483/44; 483/49; 29/27 C; 409/212; 409/192; 82/122

(58) Field of Classification Search .................. 409/202, 409/212, 192, 203, 213, 217; 29/27 C, 27 R; 483/17–18, 54–56, 38, 39, 40, 44, 46, 48–49; 82/122

See application file for complete search history.

(56) References Cited

U.S. PATENT DOCUMENTS

RE31,288 E * 6/1983 Matsuzaki et al. ............ 29/27 C
6,428,453 B1 * 8/2002 Hoppe et al. .................... 483/58

FOREIGN PATENT DOCUMENTS

| JP | 64-011745 A1 | 1/1989 |
| JP | 2000-354929 A1 | 12/2000 |
| JP | 2007-000966 A1 | 1/2007 |

OTHER PUBLICATIONS

Chinese Office Action dated Feb. 24, 2012.

* cited by examiner

*Primary Examiner* — Erica E Cadugan
(74) *Attorney, Agent, or Firm* — Burr & Brown

(57) ABSTRACT

A machine tool includes a headstock provided with a main spindle and movable in a direction different from a direction of axis of the main spindle, a tool post mounted on the headstock so as to be movable in the direction of axis of the main spindle, and a tool change unit configured to change a tool attached to the main spindle with another tool after an extremity of the main spindle has been moved to a predetermined tool change position. In this machine tool, when an extremity of the tool post is positioned in the tool change position by the movement of the headstock and also by the movement of the tool post, the tool change unit performs change of a tool attached to the tool post with another tool by the same tool change operation as that for the main spindle.

2 Claims, 4 Drawing Sheets

MACHINE TOOL

This application claims the benefit of Japanese Patent Application Number 2008-035063 filed on Feb. 15, 2008, the entirety of which is incorporated by reference.

BACKGROUND OF THE INVENTION

1. Field of the Invention

The present invention relates to a machine tool comprising a headstock which is movable with respect to a machine body.

2. Description of Related Art

In general, a conventionally known machine tool includes a headstock mounted on a cross rail, etc. which is included in a machine body. The headstock is configured to be movable in X-axis direction as well as in Z-axis direction; the axis of a main spindle supported in the headstock is parallel to the Z-axis. In order to perform a deep-hole inner diametrical boring process using this kind of machine tool, Japanese Laid-open Patent Publication No. 2007-000966 discloses a machine tool in which a tool post having a tool attachment portion, to which a tool is attached in a direction parallel to the Z-axis, is provided at a side of and separately from the headstock so as to be movable in the Z-axis direction.

However, in the above machine tool disclosed in JP 2007-000966 A, a manual operation is required for an attachment and a removal of the tool attached to the main spindle of the headstock and the tool attached to the tool post. Therefore, change of the tools is tedious and time-consuming. Further, in the case where dedicated separate tool change devices are provided for the main spindle and the tool attachment portion of the tool post, respectively, a large installation space is required for the tool change devices. This leads to drawbacks such as less available installation space for the machine tool, and increased cost for the entire machine tool including the tool change devices.

In view of the above drawbacks of the prior art, the present invention provides a machine tool which can readily perform change of the tools attached to the main spindle and the tool attachment portion of the tool post, and which excels in cost performance.

The present invention has been made in an attempt to eliminate the above disadvantages, and illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

It is an aspect of the present invention to provide a machine tool comprising: a headstock provided with a main spindle, wherein the main spindle rotates with a tool being attached to an extremity thereof, the headstock being installed so as to be movable in a direction different from a direction of axis of the main spindle; a tool post mounted on the headstock so as to be movable in the direction of the axis of the main spindle, wherein a tool can be attached to an extremity of the tool post in the same direction as that of the axis of the main spindle; and a tool change unit configured to change the tool attached to the main spindle with another tool after the extremity of the main spindle has been moved to a predetermined tool change position. In this machine tool, when the extremity of the tool post is positioned in the tool change position by the movement of the headstock and also by the movement of the tool post, the tool change unit performs change of the tool attached to the tool post with another tool by a tool change operation that is the same as that for the main spindle.

More specifically, in this configuration, preferably but not necessarily, the main spindle may be configured to be movable in an X-axis direction as a right-and-left (i.e., horizontal) direction and in a Z-axis direction as a vertical direction, and the axis of the main spindle is parallel to the Z-axis. Also, the tool post may be installed such that the tool attached to the tool post and the tool attached to the main spindle are positioned in a same X-Z plane, and the tool post may be movable only in the Z-axis direction (i.e., relative to the headstock). Further, the tool post can be moved to the tool change position by the movement of the headstock in the X-axis direction and by the movement of the tool post in the Z-axis direction.

More specifically, in this configuration, preferably but not necessarily, the main spindle may be configured to be movable in X-axis direction as a right-and-left direction and in Z-axis direction as a vertical direction, and the axis of the main spindle is parallel to the Z-axis. Also, the tool post may be installed such that the tool attached to the tool post and the tool attached to the main spindle are positioned in a same X-Z plane, and the tool post may be movable only in the Z-axis direction. Further, the tool post can be moved to the tool change position by the movement of the headstock in the X-axis direction and by the movement of the tool post in the Z-axis direction.

According to the present invention, change of the tools attached to the headstock and the tool post can be performed by the tool change unit. Therefore, notwithstanding two separate tools are attached to the headstock and the tool post, respectively, change of these tools can be performed very smoothly, which leads to an ease of the tool change operation and improved working efficiency. Further, one tool change unit can perform change of the tools for both the headstock and the tool post. This can reduce the number of required tool change devices when compared with the conventional machine tool and thus minimize the installation space required for tool change devices, which can prevent the size of the machine tool from being increased more than necessary as well as prevent an increase in the cost. Furthermore, the change of the tool attached to the main spindle of the headstock and the change of the tool attached to the tool post can be performed by the same tool change operation using the tool change unit. This can lead to simplification of the construction of the tool change unit and the control for the tool change operation.

In a particular embodiment where the tool post is installed such that the tool attached to the tool post and the tool attached to the main spindle are positioned in the same X-Z plane, and is movable only in the Z-axis direction, when the tool attached to the tool post is to be changed, the tool post can be moved to and positioned in the tool change position only by the movement of the headstock in the X-axis direction and by the movement of the tool post in the Z-axis direction. This can lead to simplification of the positioning control for the movement toward the tool change position.

BRIEF DESCRIPTION OF THE DRAWINGS

The above aspect, other advantages and further features of the present invention will become more apparent by describing in detail illustrative, non-limiting embodiments thereof with reference to the accompanying drawings, in which.

DETAILED DESCRIPTION OF THE INVENTION

Figure 1:
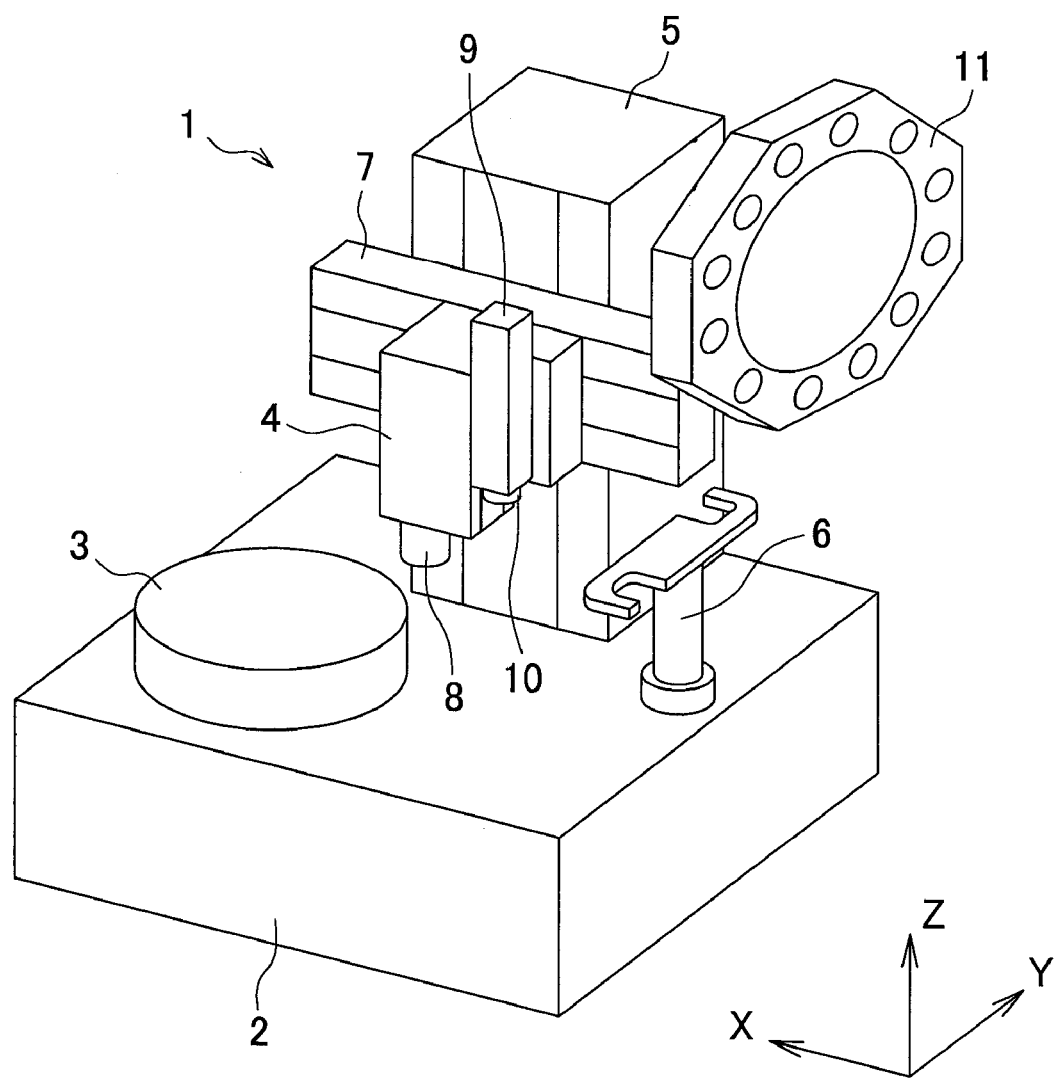
FIG. 1 is an explanatory perspective view illustrating the external appearance of a machine tool according to the present invention.

With reference to the accompanying drawings, a machine tool according to one preferred embodiment of the present invention will be described. In FIG. 1, the X-axis direction is also referred to as a right-and-left direction, the Y-axis direction is also referred to as a front-and-rear direction, and the Z-axis direction is also referred to as a vertical (upper-and-lower) direction.

Figure 2:
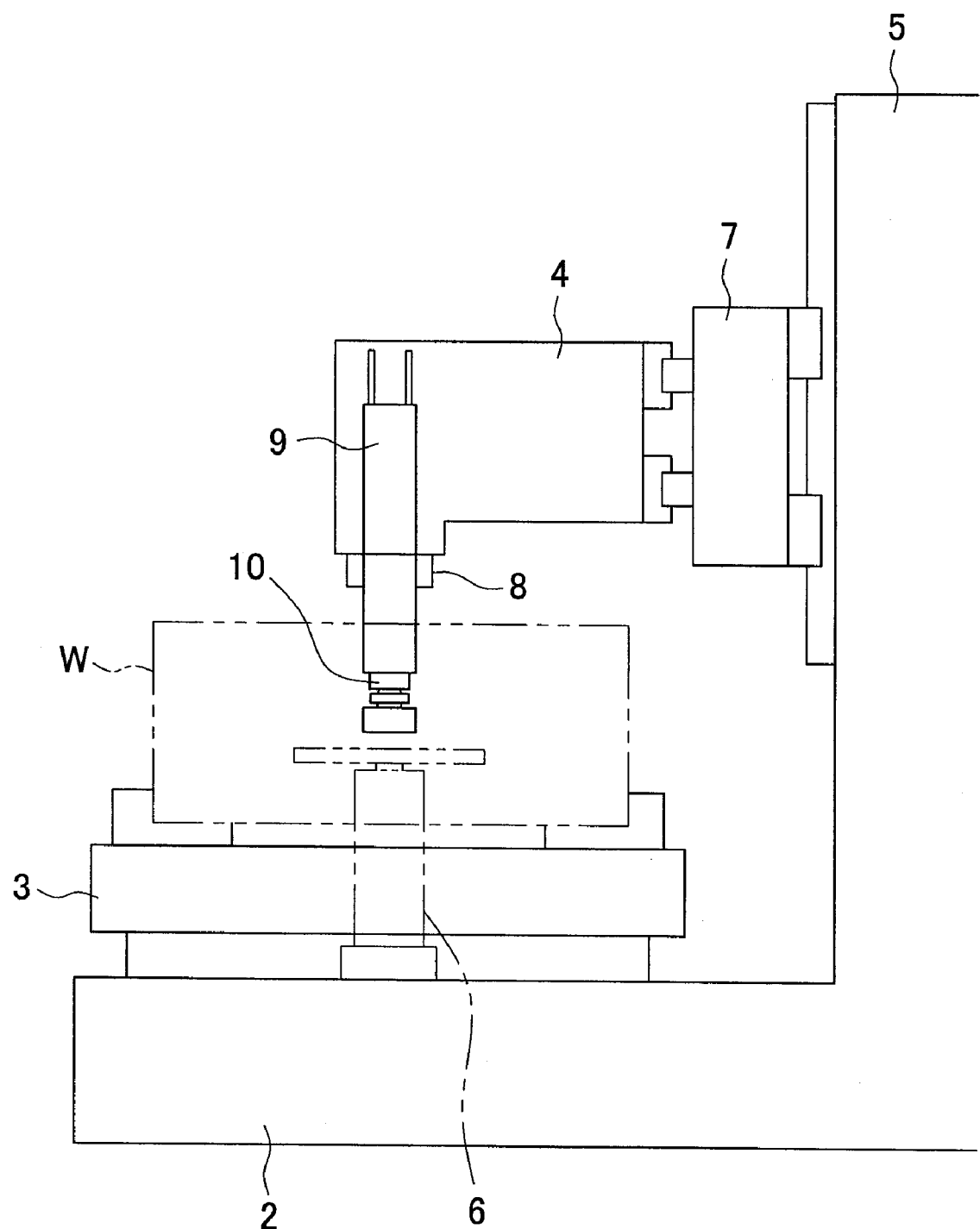
FIG. 2 is an explanatory sectional view of the machine tool taken along a Y-Z plane.

As seen in FIGS. 1 and 2, a machine tool 1 includes a bed 2, a table 3 onto which a work W is placed, a column 5 having a headstock 4, and a tool change arm (tool change unit) 6 for change of tools. The table 3 is provided on the bed 2 at a front side position of the machine tool 1 and is rotatable around an axis parallel to the Z-axis. The column 5 is provided on the bed 2 at a rear side position of the machine tool 1. A cross rail 7, which extends in the right-and-left direction, is mounted on the front face of the column 5 so as to be movable in the vertical direction. Further, the headstock 4 is mounted on the front face of the cross rail 7 in such a manner as to be movable in the right-and-left direction.

The headstock 4 is provided with a main spindle 8, which rotates around an axis parallel to the Z-axis and protrudes downwardly from the headstock 4. When a turning tool holder or a rotating tool is attached to the main spindle 8 and a work W is placed on the table 3, the machine tool 1 is ready for a turning operation or a machining operation. On the right-hand surface of the headstock 4, a tool post 9 is provided with a tool attachment portion 10 to which a tool is attached in a direction same as that of the main spindle 8. The tool post 9 is arranged separately from the headstock 4 so as to be movable in the vertical direction. The tool post 9 is configured to be considerably smaller than the headstock 4 so as to perform a deep-hole inner diametrical boring process for the work W; the tool post 9 has a smaller cross-sectional area particularly in its diametrical direction, namely in the X-Y plane.

Further, the tool change arm 6 for change of the tools attached to the main spindle 8 and the tool attachment portion 10 is provided on the bed 2 and at a right-hand side of the machine tool 1 remote from the headstock 4. The tool change arm 6 is rotatable around an axis parallel to the Z-axis and movable in the vertical direction. The tool change arm 6 has a pair of holding portions which are symmetrically protruding from its central shaft. The movement of the tool change arm 6 in the vertical direction allows a tool to be attached to the main spindle 8 or to the tool post 9. The tool change arm 6 then changes the tool by removing the tool therefrom with one holding portion and by attaching another tool thereto with the other holding portion. In other words, the rotational movement of the tool change arm 6 allows an exchange between the removed tool and the tool that is prepared for change. As best seen in FIG. 2, the rotation shaft of the tool change arm 6 is positioned in the same X-Z plane where the main spindle 8 and the tool attachment portion 10 are positioned, so that the arm length of the tool change arm 6 can be shortened. This can advantageously reduce the size of the tool change unit, which is also preferable in terms of speeding up the tool change operation for the tools. The reference numeral 11 indicates a tool magazine (tool change unit) configured to hold a plurality of tools. The tool magazine 11 is arranged above the bed 2 at a side of the column 5.

Figure 3:
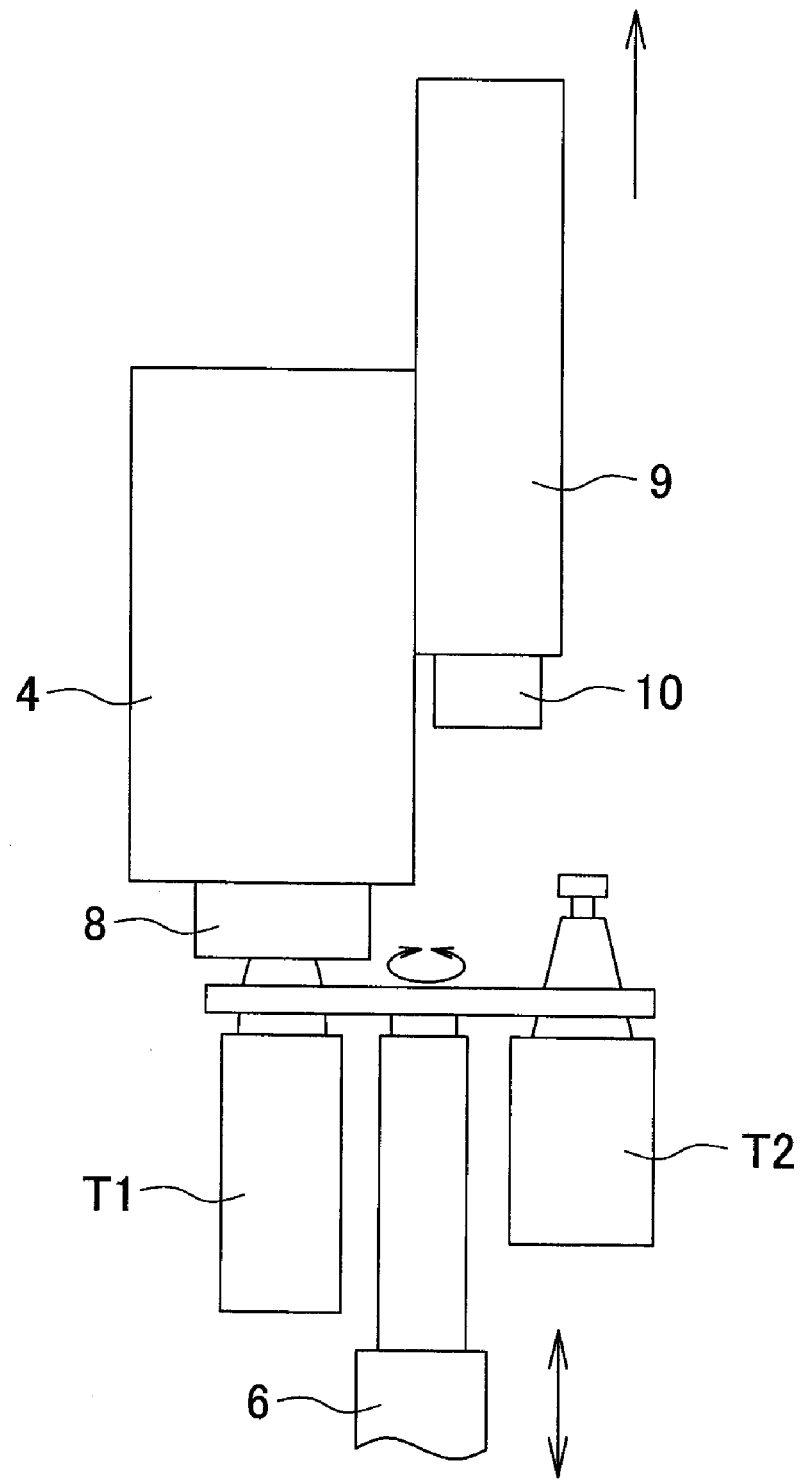
FIG. 3 is an explanatory view illustrating change of a tool attached to a main spindle of the machine tool as seen from the front side.
Figure 4:
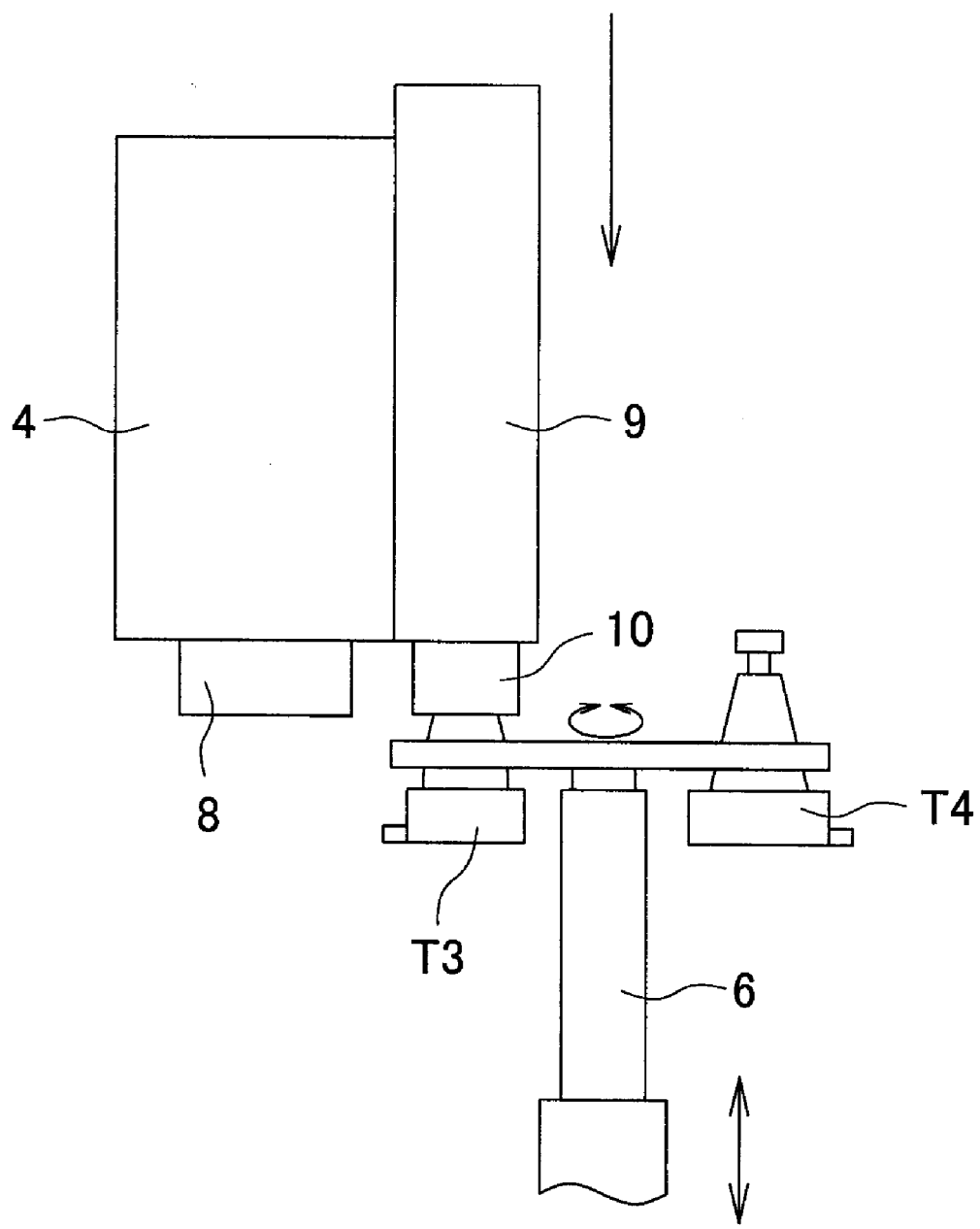
FIG. 4 is an explanatory view illustrating change of a tool attached to a tool attachment portion of the machine tool as seen from the front side.

With reference to FIGS. 2 to 4, description will be given of the machine tool 1 used in the machining operation for a work W and the tool change operation for tools.

To perform the machining operation for a work W using the main spindle 8, the headstock 4 and the cross rail 7 are moved in the X-axis direction and the Z-axis direction, respectively, above the work W while the mains spindle 8 rotates. When a deep-hole inner diametrical boring process is performed on the work W using the tool post 9, as shown in FIG. 2, the cross rail 7 is moved upward to prevent the headstock 4 from interfering with the work W, and then the headstock 4 is moved in the X-axis direction to position the tool post 9 above the work W. Thereafter, only the tool post 9 is moved in the vertical direction while the work W is being rotated to thereby perform the inner diametrical boring process.

On the other hand, when the tool attached to the main spindle 8 is to be changed, the headstock 4 is moved in the right-hand direction so that the main spindle 8 is positioned in a predetermined tool change position that is right above a point on the rotation trajectory of the holding portions of the tool change arm 6 and that is in the same X-Z plane where the main spindle 8 and the tool attachment portion 10 of the tool post 9 are positioned. In order to prevent the tool post 9 from interfering with a tool during the tool change operation, the tool post 9 is retracted upward. In this position, the tool change arm 6 is rotated so that one holding portion with holding no tool is positioned right below the tool change position. The tool change arm 6 is moved upward to hold a tool T1 attached to the main spindle 8 using the one holding portion, and then the tool change arm 6 is moved downward to remove the tool T1 from the main spindle 8. By rotating the tool change arm 6 with 180 degrees, the removed tool T1 and a tool T2 held by the other holding portion are exchanged in the position right below the tool change position. In this position of the tool T2, the tool change arm 6 is again moved upward toward the main spindle 8, so that the tool T2 is attached to the main spindle 8, and the tool change arm 6 is then moved downward. Finally, the tool change arm 6 is rotated in the reverse direction until the holding portions are returned to the original positions such as shown in FIG. 1, and the tool change operation for the main spindle 8 is completed.

When the tool attached to the tool attachment portion 10 is to be changed, the headstock 4 is moved in the right-hand direction so that the tool attachment portion of the tool post 9 is positioned in the predetermined tool change position; that is, the tool post 9 is positioned right above the point on the rotation trajectory of the holding portions as shown in FIG. 4. As with the tool change operation for the main spindle 8, the tool change arm 6 is rotated in the horizontal direction and moved in the vertical direction so that a tool T3 attached to the tool attachment portion 10 is removed and changed with a tool T4.

Tools are exchanged between the tool change arm 6 and the tool magazine 11 by the method as disclosed in Japanese Laid-open Patent Publication No. 2000-354929, the disclosure of which is herein incorporated by reference in its entirety. Further, the movements of the cross rail 7 and the headstock 4, the movement of the tool post 9, the rotating movement of the main spindle 8, the rotational movement of the tool change arm 6, etc. are numerically controlled by an NC device (not shown).

According to the machine tool 1 with the configuration as described above, change of the tools attached to the main spindle 8 and the tool post 9 can be performed only by the tool change arm 6 that is provided on the bed 2 at the right-hand side of the machine tool 1. Therefore, notwithstanding two separate tools are attached to the main spindle 8 and the tool post 9, respectively, change of these tools can be performed very smoothly, which leads to an ease of the tool change operation and improved working efficiency. Further, the tool change arm 6 and the tool magazine 11 are provided on the bed 2 where the headstock 4 is also installed thereon. Therefore, when compared with a machine tool in which a separated tool-change device is arranged adjacent to the bed 2, the size of the machine tool 1 can be reduced, leading to an ease of installation of the machine tool 1 in a factory.

In addition, one tool change arm 6 can perform change of the tools for the main spindle 8 and the tool post 9. As a result, the installation space required for the tool change unit can be minimized, preventing the size of the machine tool 1 from being increased more than necessary as well as preventing an increase in the cost. Further, the tool post 9 is mounted such that the tool attached to the main spindle 8 and the tool attached to the tool post 9 are positioned in the same X-Z plane, and is movable only in the Z-axis direction. Therefore, when the tool attached to the tool attachment portion 10 of the tool post 9 is to be changed, the tool attachment portion 10 can be moved to and positioned in the tool change position only by the movement of the headstock 4 in the X-axis direction and by the movement of the tool post 9 in the Z-axis direction. This can lead to simplification of the positioning control for the movement toward the tool change position. Furthermore, the change of the tool attached to the main spindle 8 and the change of the tool attached to the tool attachment portion 10 can be performed by the same tool change operation using the tool change arm 6. This can lead to simplification of the construction of the tool change unit and the control for the tool change operation.

Although the present invention has been described in detail with reference to the above preferred embodiment, the present invention is not limited to the above specific embodiment and various changes and modifications may be made without departing from the scope of the appended claims. For example, the construction of the headstock, the construction of the tool post, the construction of the tool change arm, etc. may be modified where necessary.

In the machine tool 1 according to the above preferred embodiment, the tool change arm 6 and the tool magazine 11 are arranged on the bed 2. However, instead of such an integral structure of the machine tool 1, a machine tool may be configured such that a tool change arm and a tool magazine are arranged in a discrete tool change device separately from a machine body including a bed, a column, a headstock, etc. and that the tool change device is arranged at a side of and adjacent to the machine body. Of course, the tool change arm may be movable in the X-axis direction and the Y-axis direction so that the tool change operation for the tools includes the movements of the tool change arm in the X-axis direction and the Y-axis direction.

As with the main spindle 8 of the headstock 4, the tool attachment portion 10 of the tool post 9 may be configured as a main spindle which rotates around an axis parallel to the Z-axis. In this instance, the axis of the main spindle 8 of the headstock 4 and the axis of the main spindle of the tool post 9 are aligned in the same X-Z plane.

Of course, the tool post 9 may be mounted on the headstock 4 so as to be movable in other directions such as the Y-axis direction, in addition to the Z-axis direction. Furthermore, the construction required for machining is not limited to the specific construction as described in the above preferred embodiment. It is possible that the table 3 may be movable in the front-and-rear direction and that the main spindle 8 may be pivotable around the X-axis.

What is claimed is:

1. A machine tool comprising:
    a headstock provided with a main spindle, wherein the main spindle rotates with a tool being attached to an extremity thereof, the headstock being installed so as to be movable in an X-axis direction as a direction different from a direction of a longitudinal axis, corresponding to a Z-axis, of the main spindle;
    a tool post mounted on the headstock so as to be movable relative to the headstock in the direction of the Z-axis, wherein a tool can be attached to and detached from an extremity of the tool post by movements including said movement of said tool post in the Z-axis direction relative to the headstock; and
    a tool change unit configured so as to be movable relative to the headstock in the Z-axis direction and configured to change the tool attached to the main spindle with another tool after the extremity of the main spindle has been moved to a predetermined tool change position, and
    wherein when the extremity of the tool post is positioned in said predetermined tool change position, which is the same position where the tool attached to the main spindle is changed, said positioning of the extremity of the tool post in the predetermined tool changing position occurring by the movement of the headstock in the X-axis direction, and also by the movement of the tool post in the Z-axis direction, said tool change unit performs a change of the tool attached to the tool post with another tool by a tool change operation via movement of the tool change unit relative to the headstock in the Z-axis direction to remove the attached tool from the tool post and also to place another tool at the tool post for attachment thereto, which tool change operation is the same as that for the main spindle, whereby the change of the tool attached to the main spindle and the change of the tool attached to the extremity of the tool post are performed by said tool change unit and at said same tool change position.

2. A machine tool according to claim 1, wherein the X-axis direction is a horizontal direction and the Z-axis direction is a vertical direction, and wherein the tool post is installed and is movable relative to the headstock in the Z-axis direction, such that the tool attached to the tool post and the tool attached to the main spindle are positioned in a same X-Z plane.

* * * * *